W. H. HART, Jr.
MAILING ENVELOP.
APPLICATION FILED APR. 7, 1916.
1,216,800.
Patented Feb. 20, 1917.
2 SHEETS—SHEET 2.
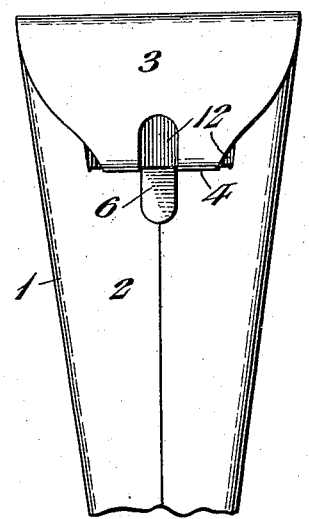
Fig. 7.
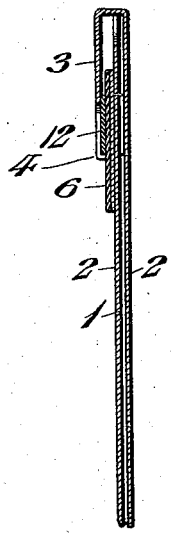
Fig. 8.
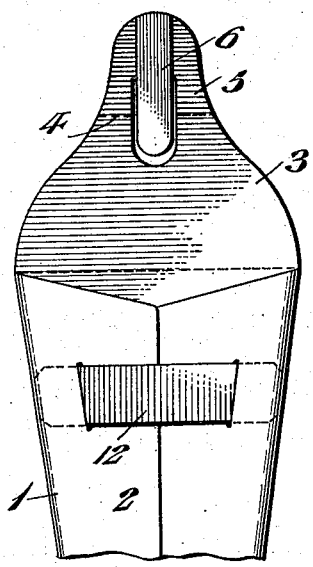
Fig. 9.
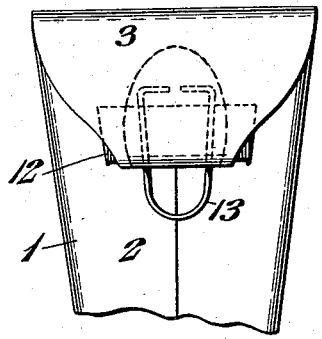
Fig. 10.
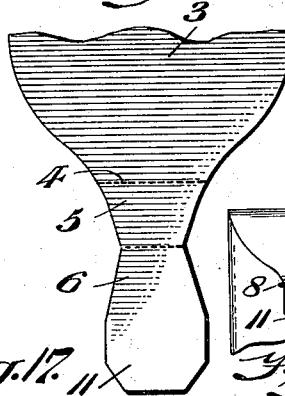
Fig. 11.
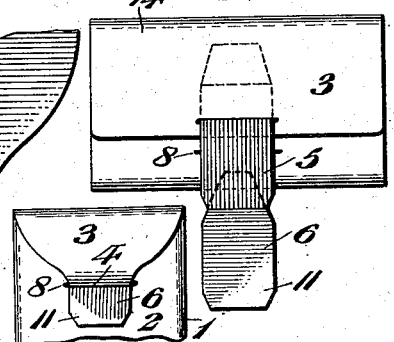
Fig. 12.
Fig. 17.
Fig. 16.
WITNESSES
H. G. Dieterich
L. Douville
INVENTOR
William H. Hart, Jr.
BY Dedersheim + Fairbanks
ATTORNEYS

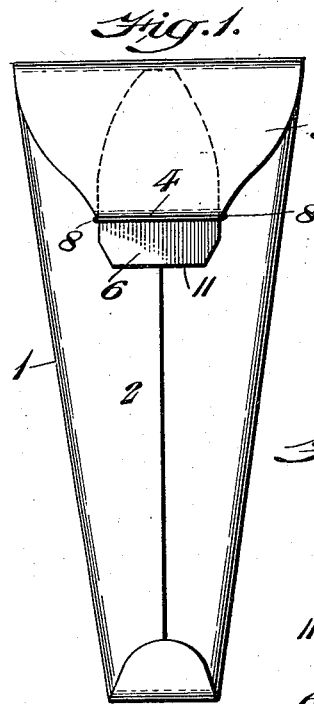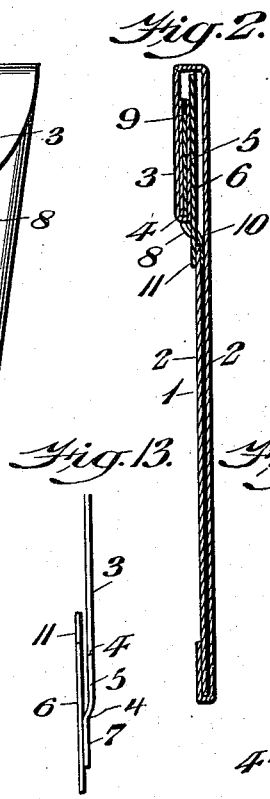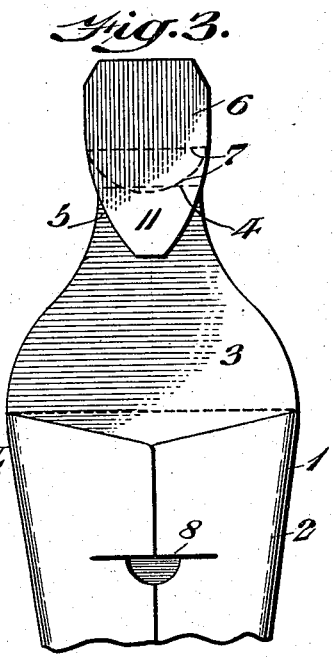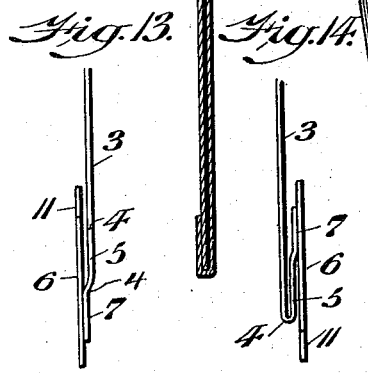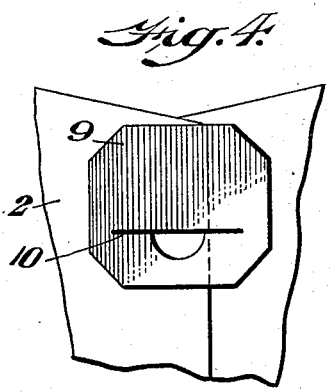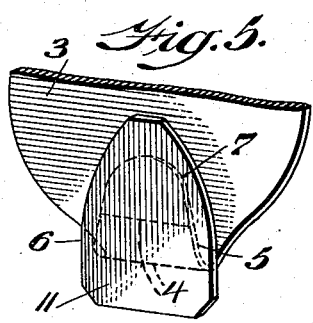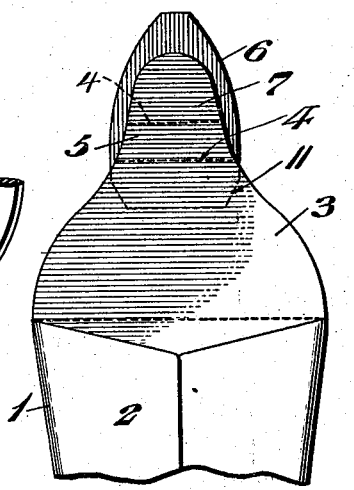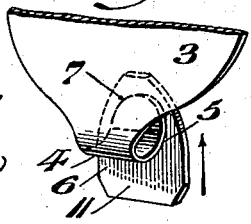

UNITED STATES PATENT OFFICE.

WILLIAM H. HART, JR., OF PHILADELPHIA, PENNSYLVANIA.

MAILING-ENVELOP.

1,216,800.  Specification of Letters Patent.  Patented Feb. 20, 1917.

Application filed April 7, 1916. Serial No. 89,526.

*To all whom it may concern:*

Be it known that I, WILLIAM H. HART, Jr., a citizen of the United States, residing in the city and county of Philadelphia, State of Pennsylvania, have invented a new and useful Mailing-Envelop, of which the following is a specification.

My invention consists of a mailing envelop for merchandise or goods, having on the closing flap thereof a tongue which may be folded upwardly into the back of the envelop, so that the latter may be opened by drawing said tongue downwardly so as to be disengaged from said back, whereby said closing flap is likewise disengaged from said back, and thus the flap is in open condition.

The invention is satisfactorily illustrated in the accompanying drawing, but the important instrumentalities thereof may be varied, as long as they are included in the scope of the claims.

Figure 1 represents a rear elevation of an envelop in closed condition embodying my invention.

Fig. 2 represents a longitudinal section thereof.

Fig. 3 represents a rear elevation of a portion of the envelop with the flap in open position.

Fig. 4 represents a view of the interior of a portion of the body of the envelop.

Fig. 5 represents a perspective view of the flap of the envelop taken from the inner side and in open position.

Fig. 6 represents a rear view of a portion of the envelop with the flap in open position, as in Fig. 3, but with the tongue employed in a different position.

Fig. 7 represents a rear elevation of an envelop in closed condition having a punched-out tongue integral therewith.

Fig. 8 represents a longitudinal section thereof.

Fig. 9 represents a rear elevation of the form shown in Figs. 7 and 8 with the flap in open position.

Fig. 10 represents a rear elevation of an envelop in closed position having a tongue formed of a loop of wire.

Figs. 11 and 17 represent elevations of a tongue integral with the flap of the envelop.

Fig. 12 represents a rear elevation of a wallet or pocket book to which my invention is applied.

Figs. 13 and 14 represent side elevations of the flap and appurtenances of the envelop shown in Fig. 1, in different positions.

Fig. 15 represents a perspective view of the flap and appurtenances in position preparatory to interlocking with the body of the envelop.

Fig. 16 represents a rear elevation of an envelop of different shape from those shown in the previous figures.

Similar numerals of reference indicate corresponding parts in the figures.

Referring to the drawings:

1 designates an envelop whose body is composed of the front and rear walls 2, and the closing flap 3 on the rear thereof, said flap having thereon near its lower end the transversely-extending parallel crease lines 4, forming the fold 5, which may be turned upwardly and placed against the back of the portion of the flap above the lower crease line 4, the latter acting as a hinge for said fold 5.

Connected with the lower end portion of the fold 5 is the tongue 6 which depends therefrom and may be affixed to said portion by adhesive material as at 7, in Figs. 3, 5, 6, 7, 13 and 14, or constitute an integral member of the fold as shown in Fig. 11.

In the back wall 2 of the envelop is the transversely-extending slit 8, which is reinforced by the piece 9 of material which is gummed to said back and formed with a slit 10 which is in register with the slit 8.

When the envelop is in open condition, the flap 3 and the appurtenances thereof are in the position shown in Fig. 3. The body of the envelop is then filled, and the flap turned down on the back of said body when what was the upper end portion 11 of the tongue is below and what was the lower end of said tongue is now above, back of the lower terminal portion of the flap 3, as a point end extending upwardly so as to be capable of entering with said portion the slit 8. Then the tongue turning on the lower crease line with a lever-like action is raised and said point end introduced into said slit and pushed upwardly therethrough so as to enter the body of the envelop contiguous to the back wall 2 thereof. This leaves the portion 11 projecting downwardly below said slit as a finger piece. Owing to the fold 5 of the flap 13, the tongue is permitted to have an excess of upward motion in said slit 8 whereby said fold follows the tongue and rises therewith and is placed upon the exterior face of the tongue, and so in contact with the inner side of the back wall 2 of the envelop, the extent of ascent of said fold 5 being limited by the upper crease line 4, which now comprises a band contacting with the upper wall of the slit 8, as a stop, it being noticed that the lower portion of the tongue is exterior of the back wall of the envelope where it is accessible as a finger piece.

It will now be noticed that to all intents and purposes, the envelop is tightly closed and its contents will not escape at the flap 3, while the envelop may be mailed, said contents remaining with comparative safety in the envelop.

Should a postal official desire to inspect the contents, the tongue is grasped and drawn downwardly, whereby it slides in similar direction through the slit 8, and the fold 5 follows said tongue and consequently also slides downwardly through said slit. As soon as the tongue and fold clear the walls of the slit they are disconnected from the back wall of the envelop and so the flap is free to be raised from said wall, and the body of the envelop is open to permit the inspection, after which the envelop may be closed as before, and in condition for further service.

In Figs. 7, 8 and 9 I show the tongue 6 as punched out of the fold 5, and flap 3, and instead of the slit 8 employed in the previous figures, a cross bar 12.

In Fig. 10, I show the tongue 6 as formed partly of the loop 13 of wire, which also constitutes the finger piece of said tongue. In this case, said tongue may engage the cross bar 14 on the back wall of the envelop.

In Figs. 11 and 17 I show tongues 6 each as integral continuities of the flap 3 without producing different results from the other constructions.

In Fig. 12 I show a wallet or pocket book which has a tongue 6 on the fold 5, and the latter secured to the flap 3 by adhesive material or other means, the back wall of said wallet or book having therein the slit 8 for locking or closing engagement therewith of the tongue and fold, as in the previous cases, it being evident that the envelop is not limited to the tapering forms shown, as it may be quadrilateral, as in ordinary envelops, as in Fig. 16.

Having thus described my invention what I claim as new and desire to secure by Letters Patent, is:—

1. In an envelop of the character stated, a body having a slit in its rear wall, and its closing flap provided with transversely-extending parallel crease lines thereon forming a fold between the same, said lines serving as separate hinges for said fold, and an overturning tongue extending from said fold at the lower crease line thereon, said fold being adapted to be placed on a portion of said tongue, and said fold and said portion to enter together the envelop through said slit, the remaining portion of said tongue being pendant from said fold on the exterior of the back of the envelop and free of said back as a finger piece.

2. In an envelop of the character stated, a body having a slit in its rear wall and its closing flap provided with transversely-extending parallel crease lines thereon forming a fold between said lines, a lever-like tongue secured partly to the terminal portion of said flap and extending in part from said flap at the lower crease line of the latter adapting said tongue to turn upwardly on said lower crease line, and said fold to lie on the adjacent portion of said tongue adapting the upper portion of said tongue and the said fold to enter together the envelop through said slit limited by the upper crease line of the flap, and adapting the lower portion of said tongue to be placed on the exterior of the rear wall of the body free therefrom as a finger piece.

WILLIAM H. HART, Jr.

Witnesses:
 JOHN A. WIEDERSHEIM,
 W. BUSSINGER.

Copies of this patent may be obtained for five cents each, by addressing the "Commissioner of Patents, Washington, D. C."